United States Patent
Chu et al.

(10) Patent No.: US 11,100,368 B2
(45) Date of Patent: Aug. 24, 2021

(54) ACCELERATED TRAINING OF AN IMAGE CLASSIFIER

(71) Applicant: GumGum, Inc., Santa Monica, CA (US)

(72) Inventors: Gregory Houng Tung Chu, Los Angeles, CA (US); Matthew Aron Greenberg, Culver City, CA (US); Francisco Javier Molina Vela, Santa Monica, CA (US); Joshua Alexander Tabak, Los Angeles, CA (US)

(73) Assignee: GumGum, Inc., Santa Monica, CA (US)

( * ) Notice: Subject to any disclaimer, the term of this patent is extended or adjusted under 35 U.S.C. 154(b) by 33 days.

(21) Appl. No.: 16/451,696

(22) Filed: Jun. 25, 2019

(65) Prior Publication Data

US 2020/0410287 A1    Dec. 31, 2020

(51) Int. Cl.
*G06N 20/20*     (2019.01)
*G06K 9/62*      (2006.01)
*G06K 9/00*      (2006.01)
*G06K 9/46*      (2006.01)

(52) U.S. Cl.
CPC ....... *G06K 9/6256* (2013.01); *G06K 9/00536* (2013.01); *G06K 9/4642* (2013.01); *G06K 9/6267* (2013.01); *G06N 20/20* (2019.01)

(58) Field of Classification Search
CPC ............. G06K 9/6256; G06K 9/00536; G06K 9/4642; G06K 9/6267; G06K 9/6253; G06K 9/6223; G06K 9/627; G06N 20/20
See application file for complete search history.

(56) References Cited

U.S. PATENT DOCUMENTS

| | | | |
|---|---|---|---|
| 9,613,296 B1 | 4/2017 | Rosen et al. | |
| 2002/0159641 A1 | 10/2002 | Whitney et al. | |
| 2016/0342863 A1* | 11/2016 | Kwon et al. | G06K 9/6267 |
| 2016/0379091 A1* | 12/2016 | Lin et al. | G06K 9/62 |

(Continued)

OTHER PUBLICATIONS

Zi Lin Zhang et al., Adaptive Matrix Sketching and Clustering for Semi-supervised Incremental Learning, IEEE Signal Processing Letters., vol. 25, No. 7, Jul. 1, 2018, pp. 1069-1073, XP055727526.

(Continued)

*Primary Examiner* — Siamak Harandi
(74) *Attorney, Agent, or Firm* — Knobbe, Martens, Olson & Bear, LLP

(57) ABSTRACT

Systems and methods are provided for generating labeled image data for improved training of an image classifier, such as a multi-layered machine learning model configured to identify target image objects in image data. When the initially trained classifier is unable to identify a particular object in input image data, such as an object that did not appear in initial training data, feature information determined by the classifier for the given image data may be provided to a clustering model. The clustering model may group image data having similar features into different clusters or groups, which may in turn be labeled at the group level by an annotator. The image data assigned to the different clusters, along with the associated labels, may subsequently be used as training data for training a classifier to identify the labeled objects in images.

19 Claims, 5 Drawing Sheets

(56) References Cited

U.S. PATENT DOCUMENTS

2018/0084309 A1    3/2018  Katz et al.
2018/0121762 A1*  5/2018  Han et al. ................ G06K 9/62
2018/0300576 A1  10/2018  Dalyac et al.
2018/0348783 A1* 12/2018  Pitzer et al. ....... G06K 9/00684

OTHER PUBLICATIONS

International Search Report and Written Opinion of Patentability for PCT Patent Application No. PCT/US2020/038797, dated Sep. 14, 2020.

\* cited by examiner

ACCELERATED TRAINING OF AN IMAGE CLASSIFIER

BACKGROUND

In the field of computer vision, image classifiers are often trained by a computer to identify objects of interest in input images or videos. An image classifier may be configured to perform object recognition on an image using probabilistic models that are created or generated using machine learning techniques. For example, classifiers may be trained to determine a likelihood that a particular image object (such as a visual representation of a real world object in a digital photograph or other object depicted in an image, such as a company logo) is included or depicted in a given input image. Classifiers configured to identify a given target image object may be created or trained using exemplar images that are known to include that target image object. Accordingly, it is desirable to have annotated or labeled images available to use as training data, such as a number of images that have been manually marked or labeled by a human annotator as including a particular object of interest that the classifier will be trained to detect or identify.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Generally described, aspects of the present disclosure relate to generating labeled image data for improved training of an image classifier, such as a multi-layered machine learning model configured to identify target image objects in image data. When the initially trained classifier is unable to identify a particular object in input image data, such as an object that did not appear in initial training data, feature information determined by the classifier for the given image data may be provided to a clustering model. The clustering model may group image data having similar features into different clusters or groups, which may in turn be labeled at the group level by an annotator. The image data assigned to the different clusters, along with the associated labels, may subsequently be used as training data for training the original classifier or another classifier to identify the labeled objects in images.

Aspects of the present disclosure provide semi-automated methods for generating potentially large sets of labeled training data for an image classifier with significantly less human annotation involvement than alternative methods. For example, techniques described herein provide advantages over prior methods both in the ability to automatically determine image objects that an image classifier has not yet been trained to identify, as well as automatically grouping many instances of such objects that are similar to each other for labeling as a group by an annotator, as will be described further below.

Figure 1:
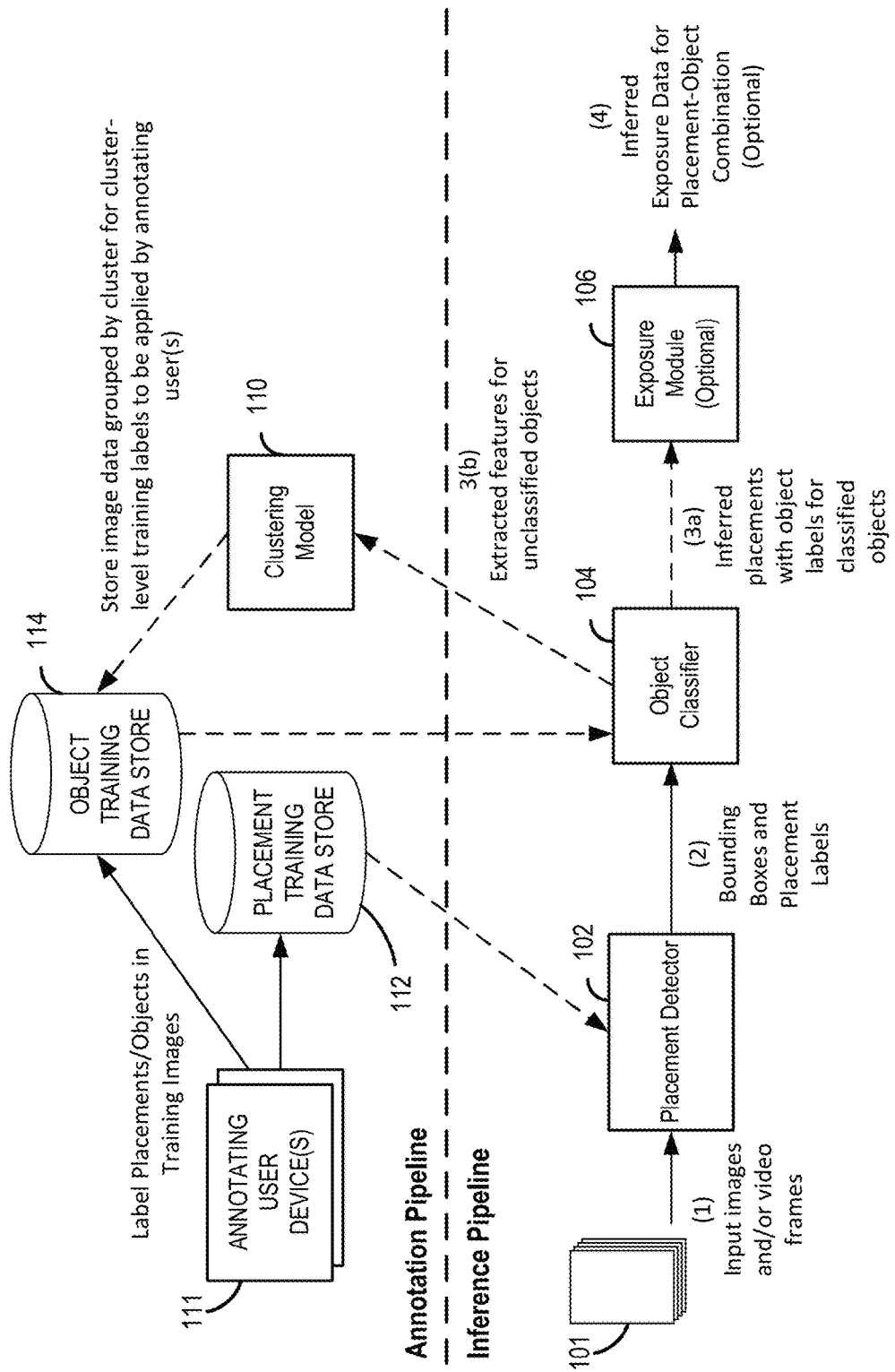
FIG. 1 illustrates a flow of data within both an inference pipeline and a related annotation pipeline associated with training and using an object classifier for classifying objects depicted in image or video data, according to some embodiments.

FIG. 1 illustrates a flow of data within both an inference pipeline and a related annotation pipeline associated with training and using an object classifier for classifying objects depicted in image or video data, according to some embodiments. The illustrative data flow may occur within a computing system 402 described below with reference to FIG. 4, with annotation data being provided by an annotating user device 111. Generally, the portions of FIG. 1 marked as the annotation pipeline are concerned with gathering and labeling image and/or video data for training the components of the inference pipeline, which includes placement detector 102 and object classifier 104. In the illustrated embodiment, the inference pipeline is concerned with identifying combinations of placements and objects in input media, and optionally inferring exposure data indicating the extent to which a given combination of placement and object appears in the input media. However, as will be discussed below, advantages described in the present disclosure are not limited to an inference pipeline that includes all of the illustrated component or that is used to infer exposure data.

As illustrated, input images and/or video frames may be provided as input at (1) to a placement detector 102. The placement detector may generally be configured to identify or localize a particular area of interest in an input image, such as by determining one or more bounding boxes or other bounding regions that each define a portion of the image to be checked for objects of interest by the object classifier 104. In one example, the computing system may be configured to monitor and analyze images or videos associated with a sporting event, such as broadcast video content and/or media posted to social networks, video hosting services, and/or other media sources, in order to detect and track company logos or other sponsorship depictions in the media. Logo tracking and associated sponsorship metric determinations are discussed in detail in co-owned U.S. patent application Ser. No. 15/709,117, entitled "AUTOMATED ANALYSIS OF IMAGE OR VIDEO DATA AND SPONSOR VALUATION", which is hereby incorporated by reference herein. In some such embodiments, the input images or video frames may be from a television broadcast of a professional sporting event that has a number of different sponsors.

In some embodiments, both the placement detector and object classifier may be or include convolutional neural networks or other deep neural networks. In other embodiments, other types of machine learning models may be used. The object classifier 104 may have been previously trained to identify logos or advertisement data of least some of these sponsors, where the logos may appear at specific real world locations or on specific real world objects within a sporting venue, such as on a press table, a rafter, an LED banner, or a basketball stanchion. In this example, the placement detector 102 may be trained to identify a portion of the input image that depicts a certain logo placement, such as identifying a press table, a rafter, an LED banner or a basketball stanchion. The object classifier 104 may then be configured at (2) to receive the bounding region and placement labels from the placement detector (e.g., bounding box coordinates in the image for a portion of the image in which a basketball stanchion appears, as well as a label such as "stanchion") and determine what company logo or visual sponsorship data (such as an advertisement) appears within the portion of the image defined by the bounding region. In some embodiments, the ultimate output of the object classifier 104 may be a placement and object pairing, such as a combination of real world location and logo appearing at the real world location. For example, a sponsor logo that is known to be both on a rafter sign in an arena and also on a basketball stanchion in that arena may have two distinct classes that the classifier may be trained to identify (e.g., one class may be represented as <stanchion, logo1> and the other as <rafters, logo1>).

The object classifier may determine a certain probability that a given input image or video frame includes a target image object (such as a specific logo), and the system may deem those frames or images associated with a probability that satisfies a certain threshold confidence or likelihood (e.g., 75%) that the target image object is depicted. On the other hand, the system may deem images associated with a probability or likelihood that does not satisfy the threshold likelihood as not including the target image object. In some embodiments, the object classifier 104 or a series or group of classifiers may be configured to identify any of hundreds of classifications (e.g., combinations of placements and associated objects of interest). In instances in which the object classifier 104 identifies a logo or other object of interest with sufficient confidence (such as meeting a threshold), the classification (e.g., the pairing on inferred placement and object label) may be provided at (3*a*), in one embodiment, to an exposure module 106. In other instances where the object classifier 104 is unable to classify the input image data with sufficient confidence, the image data and associated feature information determined by the object classifier may be passed to the clustering model 110 for processing in the annotation pipeline, discussed below.

The exposure module 106 may be configured to track the amount of time that the particular logo or other object of interest appears in a stream of input video data or series of images 101. For example, the exposure module may calculate an exposure time by determining a starting timestamp and ending timestamp in the video in which the object of interest remains visible (as detected by the object classifier analyzing individual frames), and may include applying temporal filtering. For example, the exposure module may analyze only a subset of frames at a certain sample rate and/or may apply a smoothing filter (e.g., continue counting as an exposure period even if object detection failed for a specific intermediate frame in a series). Exposure determinations are just one example of downstream use of the classifications determined by the object classifier, and are not intended to be limiting.

As illustrated in the annotation pipeline portion of FIG. 1, one or more annotating user devices 111 may be utilized by one or more human annotators. The human annotators may be responsible for labeling images and/or video frames to be used as training data for the placement detector 102 and/or the object classifier 104. In the inference pipeline examples provided above, for instance, the annotator may label images in the placement training data store 112 with labels such as "stanchion," "rafters," and/or other real world objects in a sporting venue on which advertisements, logo or other sponsorship information may appear. For example, sample video frames and/or images captured during one or more professional sporting events, potentially at a number of different venues, may be displayed to a user to annotate the image data with a bounding region around a particular placement (e.g., a press table) along with the corresponding label (e.g., "press table").

In some embodiments, an entire frame of video data or entire image may be stored in placement training data store 112, along with bounding region coordinates and associated placement labels. In other embodiments, cropped image data may be stored in the placement training data store 112 with associated labels. For example, depending on the embodiment, a training image in which a user draws two bounding boxes around two different objects (e.g., an in-venue LED sign, and a separate rafter banner) with associated class labels may be stored as two separate training images that each only include cropped image data from within the respective bounding box drawn or otherwise defined by the user.

In some embodiments, obtaining input from an annotating user may include presenting a user interface for display, either by the user directly interacting with the computing system locally or by the user utilizing an annotating user device in communication with the computing system via a network. The annotating user may be a user who is associated with training classification models and is tasked with indicating where objects of interest to that user or to another individual or entity appear in training video sample frames or images. The user interface may display a sample frame, enable the user to draw a bounding region (such as using a cursor or touch gesture to draw a rectangle or other shape) around the object of interest, label the specific object of interest (such as from a menu of labels or classes that the user has set as the objects for which classifiers are being trained), and enable the user to move on to the next sample frame when all objects of interest in the given frame are labeled.

In some embodiments, once the annotating user has defined bounding regions for objects of interest in the sample frames of each video, the computing system may apply bi-directional trackers to attempt to track the movement of the objects between successive sample frames. For example, if the annotating user defined a bounding box for a certain object in frame 1 of a given video and then defined a bounding box at different coordinates for the same object in frame 61, the computing system may try to track the movement of the object across each of frames 2-60 and store estimated bounding box information for the object with respect to each of those frames. Accordingly, although the annotating user may have only provided annotation information for ¹⁄₆₀th of the frames of a given video, a substantially larger percentage of the frames may have object annotation data stored after the tracking process is complete.

As discussed above, in instances where the object classifier 104 is unable to classify given input image data with sufficient confidence, the image data and associated feature information determined by the object classifier may be passed to the clustering model 110. This process will be described in more detail below with respect to FIGS. 2, 3A and 3B. As will be described, the clustering model 110 may receive image feature information determined by the object classifier for a number of logos or other objects that the object classifier was unable to identify, and may group them into clusters based on the feature data, such as using k-means clustering. The image data for each group or cluster may then be stored in object training data store 114, such as storing each cluster's images in a separate file directory or other structure.

An annotating user may then be presented with one or more sample or representative images from each cluster and provide a label for the cluster based on the sample. This input may be received via an automated user interface that presents an image and receives a label, or may be done manually by the user opening a directory, viewing one or more images in the directory, then changing the name of the directory to be the desired label (e.g., "XYZ Soda Ad Summer19"). Accordingly, hundreds or even thousands of sample images for the same logo or other object of interest may be labeled in object training data store 114 for training the object classifier 104 with minimal human involvement by the annotator (such as the annotator only reviewing one or a small number of the thousands of sample images).

While FIG. 1 has been described above with respect to a specific example environment for inferring exposure data of logos or other objects having specific predetermined placements in a real world scene, it will be appreciated that improvements for creating image classifier training data as described herein are not limited to environment such as that shown in FIG. 1. For example, in other embodiments, the inference pipeline could have a different purpose, such as detecting certain people depicted in image data or determining the make and model of a vehicle depicted in image data. In the first case, the placement detector could be configured to localize an area of interest in an image by identifying that a human seems to be portrayed in that portion, while the object classifier may analyze the relevant human figure portion of the image to identify a particular person. In the second case, the placement detector could be configured to localize an area of interest in an image as appearing to include depiction of a vehicle (or even apply a vehicle type label, such as "car" or "truck"), while the object classifier may analyze the relevant vehicle portion of the image to identify a particular manufacturer and model of the car or truck. In some embodiments, the image portion defined by the placement detector (such as by a bounding region determined by the placement detector) may be larger than the object that the object classifier is trained to identify. For example, the placement detector could be configured to identify a race car, while the object classifier may be trained to identify a particular driver's face who is inside the race car.

Figure 2:
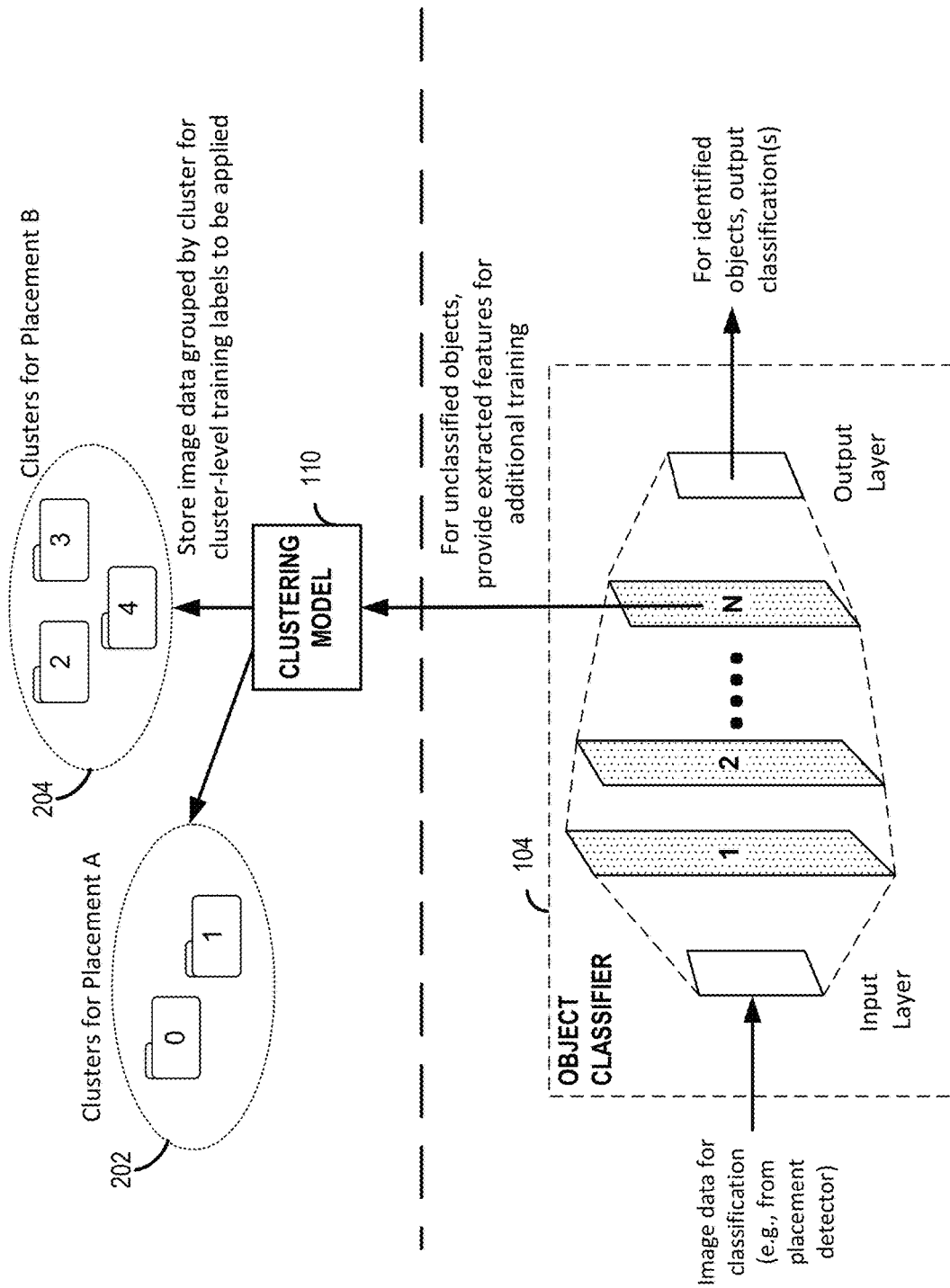
FIG. 2 provides an illustrative visual representation and data flow of image data through an object classifier and clustering model, according to some embodiments.

FIG. 2 provides an illustrative visual representation and data flow of image data through an object classifier and clustering model, according to some embodiments. In the illustrated embodiment, the object classifier 104 is a multi-layered machine learning model, such as a deep neural network. In the example of a neural network, the layers 1 through N may be hidden layers that each include a number of nodes. As is known in the art, each successive layer of nodes may aggregate and/or recombine features from the previous layer. Implementing the object classifier as a deep learning network may enable the classifier to perform automatic feature extraction rather than requiring data scientists or other humans to define features for the model. The output layer of the classifier 104 may be configured to assign a likelihood to each of one or more object labels, which may represent the likelihood or confidence of the model that a given object represented by the label is depicted in the input image that was provided at the input layer. In the given example, the input may be a portion of a larger image, such as image data within a bounding region of an image or video frame, as determined by the placement detector.

As illustrated in FIG. 2, the object classifier may output a classification (or probabilities for each of a number of class labels) when the object identifier is able to identify an object with sufficient confidence. Alternatively, when the object classifier is unable to identify an object or determine a classification (such as may occur if the given object was not present in image training data on which the object classifier was previously trained), the output of the classifier may indicate that no known object was detected, and the features generated at the penultimate layer of the object classifier (e.g., the layer immediately prior to the output layer), shown as Layer N in FIG. 2, may be provided to the clustering model 110. In other embodiments, features from a layer prior to the penultimate layer of the model may additionally or alternatively be provided to the clustering model. As is known in the art, features are typically some measurable property or characteristic of the given image data. Examples of types of features used in object recognition may include scale-invariant feature transform (SIFT) features and speeded-up-robust features (SURF), as well as many others.

While the data flow is illustrated in FIG. 2 as providing a single instance of feature information for a particular image to the clustering model, it will be appreciated that the feature and image data for a given instance may instead be stored in a particular location for later analysis by the clustering model 110, such as batch analysis for a large set of images and associated features. Given a number of different images (or image data defined within bounding regions of a larger image) and the associated features determined by the object classifier, the clustering model 110 apply k-means clustering and/or other clustering techniques to assign each of the images to a cluster or group of images having similar features as each other. In some embodiments, the clustering model 110 may employ deep learning techniques. The result of the clustering may be that images representing the same object or nearly the same object as each other (such as the same or very similar logo, optionally with the same placement label, in some embodiment) may be grouped together, thus serving as a number of sample images for the same object.

As further illustrated in FIG. 2, different sets of clusters 202 and 204 may be associated with different placements (as was determined by the placement detector, discussed above). The individual clusters (such as Cluster 0 and Cluster 1 for Placement A, and Clusters 2-4 for Placement B) may each be assigned a different file directory or other storage location in which a module associated with the clustering model stores the associated image files. The initial cluster labels, such as "2" or "4" may be randomly or sequentially generated to be unique to a given cluster, and then may ultimately be replaced by a human annotator in bulk upon review of one or more representative sample images from the cluster. In other embodiments, individual image files may be stored in a manner and location that does not directly correlate with the image's associated cluster, but a separate database, table, or other data structure may store associations between particular image files and cluster labels. In still further embodiments, metadata stored as part of the image file itself may be modified to indicate the cluster label.

Figure 3A:
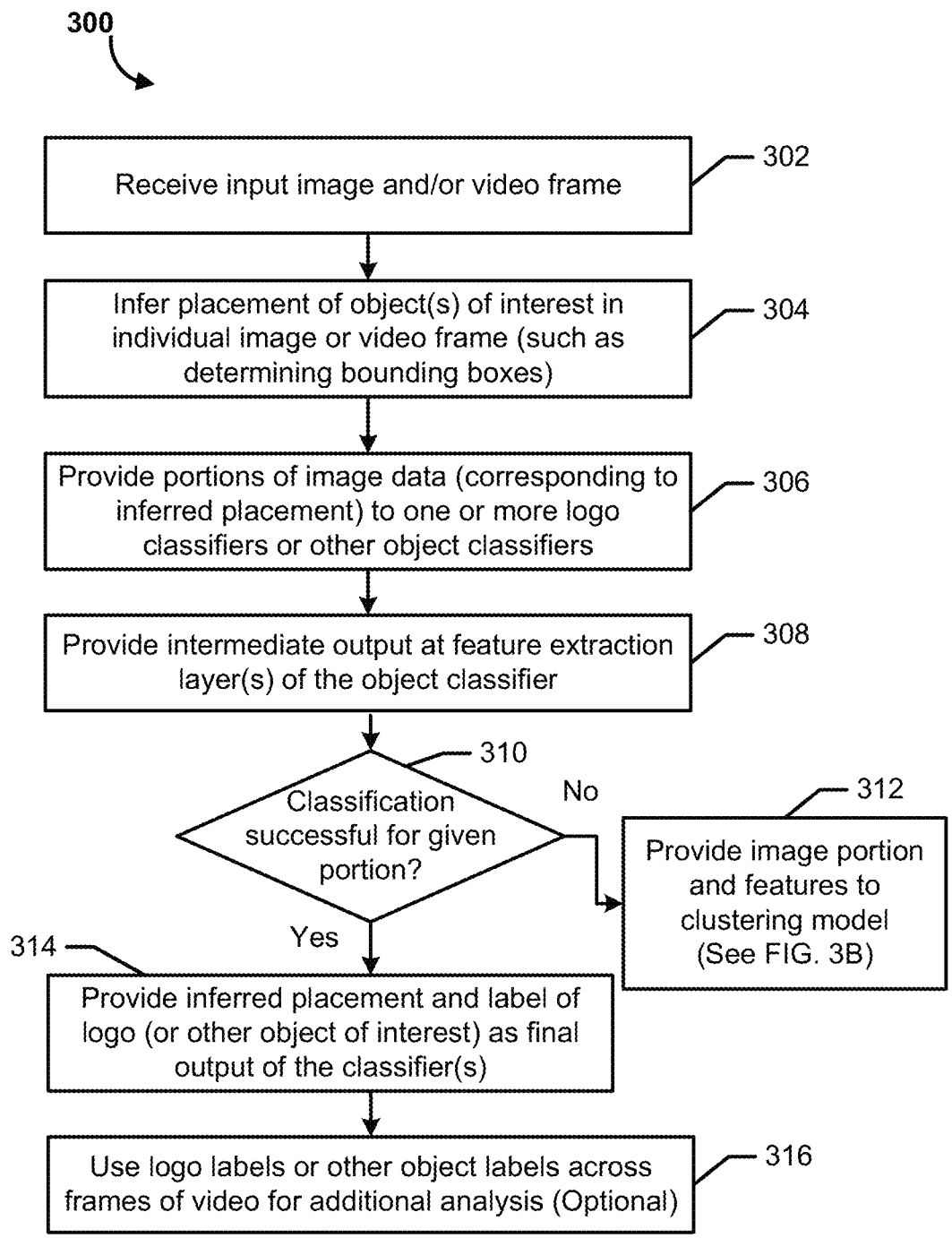
FIG. 3A is a flow diagram of an illustrative method for identifying objects of interest in image data, including marking some input data for further analysis by a clustering model, according to some embodiments.

FIG. 3A is a flow diagram of an illustrative method 300 for identifying objects of interest in image data, including marking some input data for further analysis by a clustering model, according to some embodiments. The illustrative method 300 may be implemented by a computing system, such as computing system 402 described below with respect to FIG. 4. In some embodiments, method 300 may be repeated for a large number of different input images or for a large number of different input frames of a video. However, the method will be described below with respect to a single instance of implementing the method 300 with respect to a single input image or video frame.

The illustrative method 300 begins at block 302, where the computing system may receive an input image and/or video frame. Next, at block 304, the system may infer a placement of one or more objects of interest in the input image or frame. As discussed above, this inferred placement may be performed by a placement detector configured to localize one or more areas of interest in the image (such as identifying one or more real world objects on which logos or other ultimate objects of interest may appear), which the placement detector may mark with bounding boxes, polygonal bounding regions, or in another manner that defines a portion of the image or video frame for further analysis by an image classifier. In some embodiments, multiple areas of interest or detected placements may be identified within a single image, in which case each of those image portions may separately be provided to the image classifier for analysis.

At block 306, the system may provide the one or more portions of the image data (corresponding to inferred placement at block 304) to one or more logo classifiers or other object classifiers. As discussed above, this may include providing a subset of the original image data that corresponds to the area of interest determined by the placement detector, such as the image data within a bounding region defined by the placement detector. As discussed above, this image data provided at an input layer of the classifier may then be passed through and modified by a number of layers in a deep neural network or other deep learning model. At block 308, an intermediate output at one or more feature extraction layers of the object classifier may be at least temporarily stored (such as in RAM). In some embodiments, this may be the features determined at the penultimate layer of a deep neural network, prior to the final classification layer. The final layer of the model may be configured to assign a class label (where each class label may represent a different item of interest, such as a different advertisement or company logo) based on the features determined at the penultimate layer.

At decision block 310, the system may determine if the classifier was able to identify an object (e.g., assign a class label) in the given image or image portion that was provided as input to the classifier in the given instance. In some embodiments, the system may consider the classifier to have failed to identify an object in the image data if the classifier failed to identify any object label or classification with a confidence, probability or other score that meets or exceeds a predetermined threshold. In the case that classification was not successful, the method may proceed to block 312, where the system provides the image portion and the associated features (e.g., the features determined in the earlier layer of the classifier, at block 308) to a clustering model. Subsequent steps for clustering will be described below with respect to FIG. 3B.

If instead classification was successful at block 310 (e.g., the classifier was able to identify a specific object in the input image data with sufficient confidence), the method may proceed to block 314, where the system provides one or more inferred placements and associated labels of logos (or other objects of interest) as final output of the classifier(s), as discussed above. The system may then optionally perform additional downstream analysis or actions in a given embodiment, such as using the logo labels across multiple frames of video to determine exposure time of a particular placement and logo combination, at block 316, as discussed above.

Figure 3B:
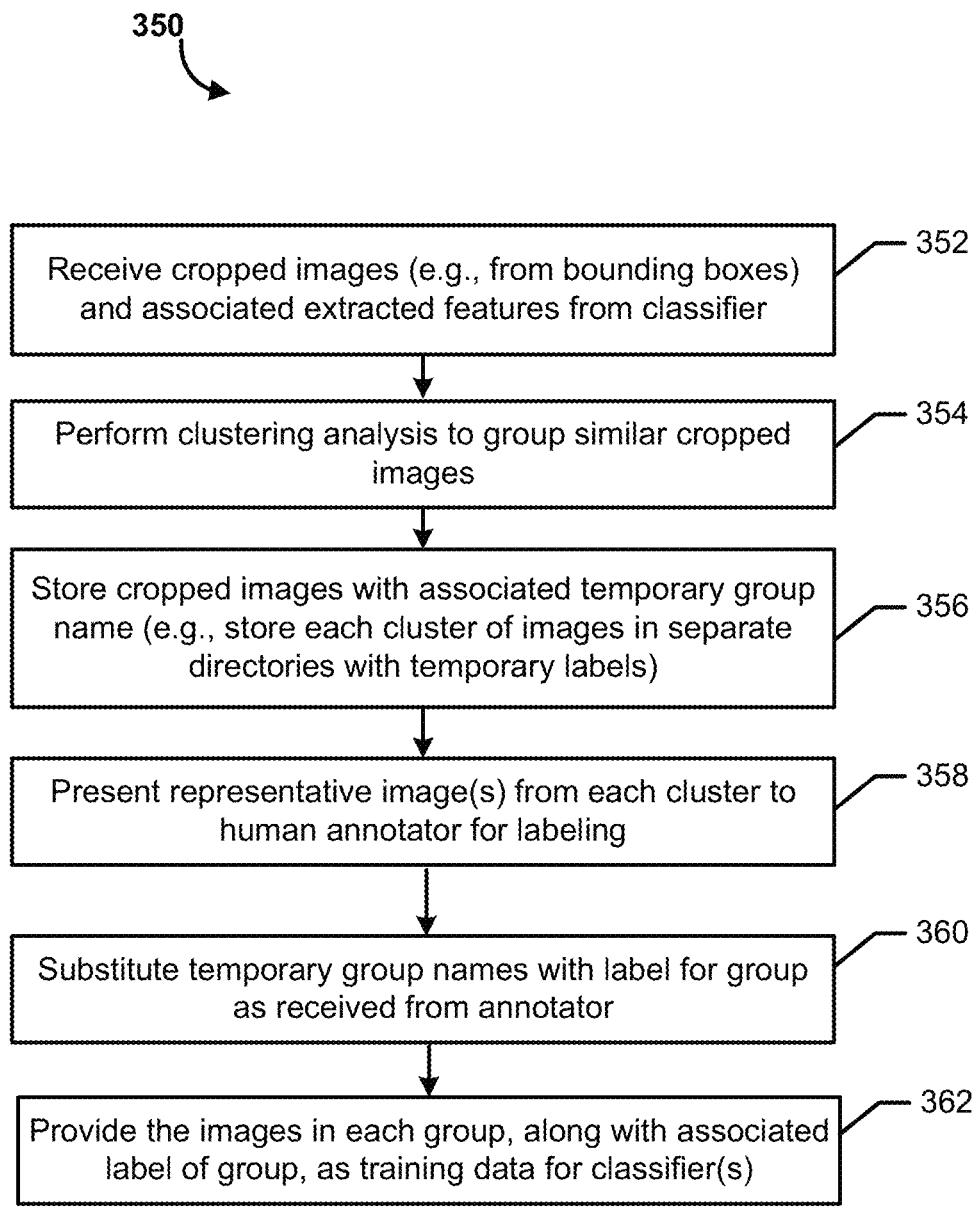
FIG. 3B is a flow diagram of an illustrative method for clustering image data and applying a label at the cluster level to quickly label image data for use in training an image classifier, according to some embodiments.

FIG. 3B is a flow diagram of an illustrative method 350 for clustering image data and applying a label at the cluster level to quickly label image data for use in training an image classifier, according to some embodiments. The illustrative method 300 may be implemented by a computing system, such as computing system 402 described below with respect to FIG. 4, and may occur after one or more instances of implementing method 300 described above.

The method 350 begins at block 352, where the computing system may receive cropped images or defined image portions (e.g., from bounding boxes determined by a placement detector, as discussed above) and associated extracted features from the classifier, as discussed above. In some embodiments, the computing system may retrieve image data and associated features for a potentially large number of images on a batch basis after hundreds or thousands of passes through the classifier for a given video or set of input images. At block 354, the computing system may then perform clustering analysis to group similar cropped images together, such as by implementing a clustering model described above. Any of a number of clustering techniques may be used, as discussed above. For example, in one embodiment, k-means clustering may be employed to group images having similar features together, where the features were previously determined in a hidden layer of the classifier and stored for the clustering model's further analysis, as discussed above.

Next, at block 356, the computing system may store the cropped images with an associated temporary group name for each cluster. For example, in one embodiment, the computing system may store the images within each cluster of images in its own file directory or other storage location designated for the given cluster. Each directory may have a name automatically assigned by the computing system to be unique, such as incrementally naming the folders or directories "1", "2", "3", etc. In other embodiments, a random or other name or label may be temporarily assigned to each directory. As discussed above, in other embodiments a temporary cluster label may be applied to individual images in ways other than storing the images of a cluster together.

At block 358, the computing system may present one or more representative image(s) from each cluster to a human annotator for labeling. In some embodiments, the computing system may select a representative image (such as an image having features near a median or average of the cluster in one or more respects) and present the image for labeling by an annotating user via a user interface generating by the computing system. In other embodiments, as discussed above, the annotator may manually browse or navigate to a given image directory, review one or more images in the directory, and then rename the directory to have the annotator's desired object label for the cluster. Whether based on input via a user interface or by retrieving the current directory name or other manually edited label, the computing system may then assign the given label provided by the annotator to all images of the given cluster, at block 360. This may result, for instance, in effectively labeling thousands of images as depicting a particular object of interest, with a human annotator potentially reviewing only a very small subset (potentially as little as one image, in one embodiment) for manual label annotation. In some embodiments, there may be instances when not all the images in a given cluster or directory depict the same concept or object (e.g., are actually different logos). A user interface may present potential outliers, or the annotating user may manually browse the images in a directory to identify outliers, which may result in the system not applying the cluster's label to those outlier images. In some embodiments, the annotating user may indicate that there is not a clear dominant concept or object depicted in the images in a given cluster, in which case the images may not have a cluster-level label applied by the system.

Lastly, at block 362, the computing system may provide the images in each group or cluster, along with the associated label of the group, as training data for either a new classifier or to retrain the existing classifier. Methods of training a classifier given the particular labeled training images are known and need not be described herein. Some example processes for training classifiers to detect given sponsors' logos or other objects of interest are described in more detail, for example, in co-owned U.S. Pat. No. 9,613,296, entitled "Selecting a Set of Examplar Images for Use in an Automated Image Object Recognition System," which is incorporated herein by reference. For example, training the object classifier may include processing each exemplar image to identify features of the image. Because the exemplar images are known to include a particular target image object, the features of the exemplar images are then associated with a probability of indicating that the target image object is included in the image. For example, if most or all of the exemplar images includes a certain feature, the presence of that feature in another, unclassified image may indicate a high likelihood that the unclassified image includes the target image object. Further, the absence of that feature in an unclassified image may indicate a lower likelihood that that unclassified image includes the target image object.

Figure 4:
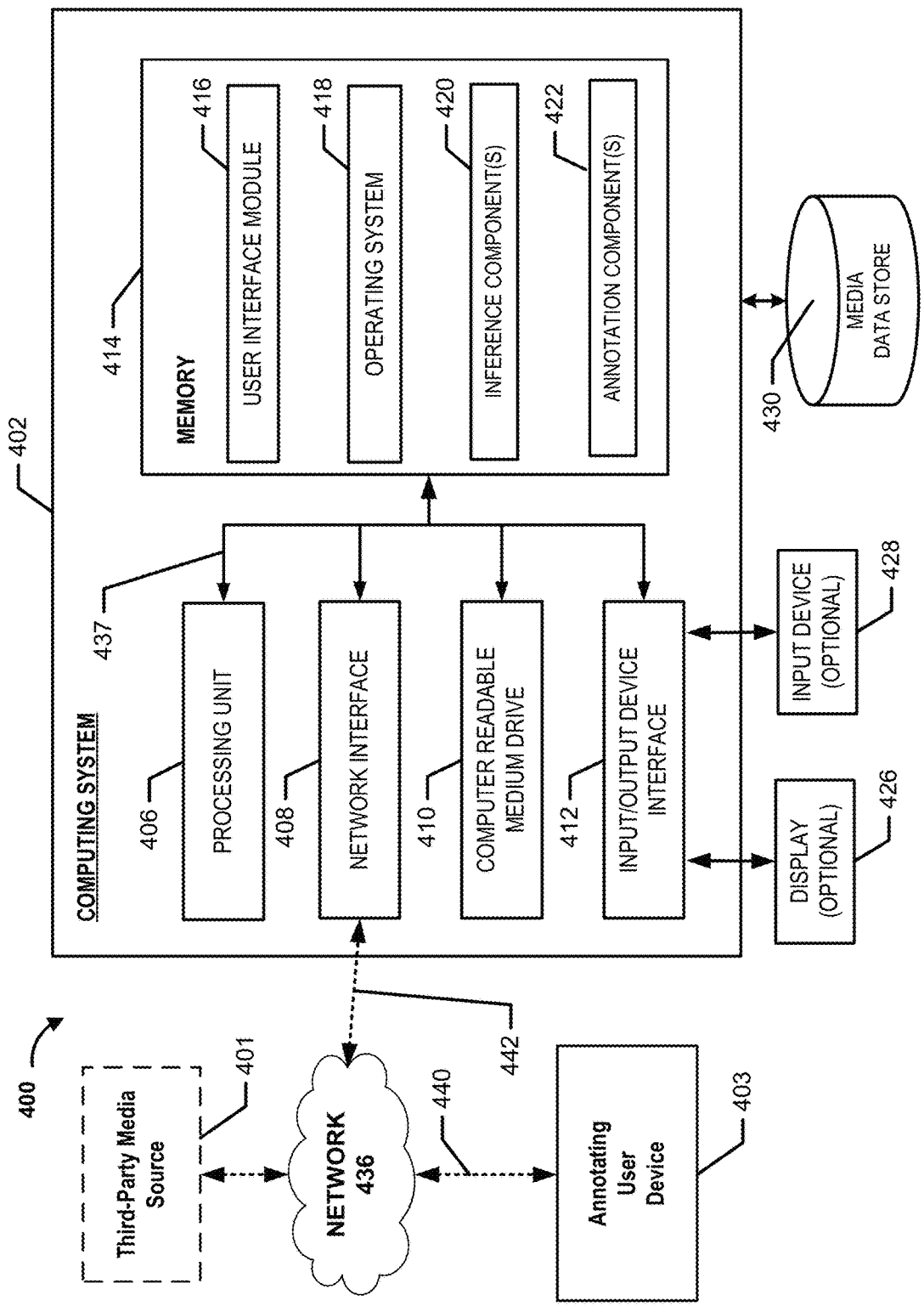
FIG. 4 is a system block diagram of a computing environment suitable for use in various embodiments of the present disclosure.

FIG. 4 illustrates a general architecture of a computing environment 400, according to some embodiments. As depicted in FIG. 4, the computing environment 400 may include a computing system 402. The general architecture of the computing system 402 may include an arrangement of computer hardware and software components used to implement aspects of the present disclosure. The computing system 402 may include many more (or fewer) elements than those shown in FIG. 4.

As illustrated, the computing system 402 includes a processing unit 406, a network interface 408, a computer readable medium drive 410, an input/output device interface 412, an optional display 426, and an optional input device 428, all of which may communicate with one another by way of a communication bus 437. The processing unit 406 may communicate to and from memory 414 and may provide output information for the optional display 426 via the input/output device interface 412. The input/output device interface 412 may also accept input from the optional input device 428, such as a keyboard, mouse, digital pen, microphone, touch screen, gesture recognition system, voice recognition system, or other input device known in the art.

The memory 414 may contain computer program instructions (grouped as modules or components in some embodiments) that the processing unit 406 may execute in order to implement one or more embodiments described herein. The memory 414 may generally include RAM, ROM and/or other persistent, auxiliary or non-transitory computer-readable media. The memory 414 may store an operating system 418 that provides computer program instructions for use by the processing unit 406 in the general administration and operation of the computing system 402. The memory 414 may further include computer program instructions and other information for implementing aspects of the present disclosure. For example, in one embodiment, the memory 414 may include a user interface module 416 that generates user interfaces (and/or instructions therefor) for display upon a computing system, e.g., via a navigation interface such as a browser or application installed on the annotating user device 403.

In some embodiments, the memory 414 may include one or more inference component(s) and annotation component(s), which may be executed by the processing unit 406 to perform operations according to various embodiments described herein. The modules or components 420 and/or 422 may access the media data store 430 in order to retrieve data described above and/or store data, such as image and/or video data. The media data store may be part of the computing system 402, remote from the computing system 402, and/or may be a network-based service.

In some embodiments, the network interface 408 may provide connectivity to one or more networks or computing systems, and the processing unit 406 may receive information and instructions from other computing systems or services via one or more networks. In the example illustrated in FIG. 4, the network interface 408 may be in communication with an annotating user device 403 via the network 436, such as the Internet. In particular, the computing system 402 may establish a communication link 442 with a network 436 (e.g., using known protocols) in order to send communications to the computing device 403 over the network 336. Similarly, the computing device 403 may send communications to the computing system 402 over the network 436 via a wired or wireless communication link 440. In some embodiments, the computing system 402 may additionally communicate via the network 436 with an optional third-party media source 401, which may be used by the computing system 402 to retrieve or receive images and/or video content for analysis as described herein. For example the media source 401 may include a social media source, a television source, streaming video source, and/or other sources of images or video data.

Those skilled in the art will recognize that the computing system 402 and user device 403 303 may be any of a number of computing systems or devices including, but not limited to, a laptop, a personal computer, a personal digital assistant (PDA), a hybrid PDA/mobile phone, a mobile phone, a smartphone, a wearable computing device, an electronic book reader, a digital media player, a tablet computer, a gaming console or controller, a kiosk, an augmented reality device, another wireless device, a set-top or other television box, one or more servers, and the like. The user device 403 may include similar hardware to that illustrated as being included in computing system 402, such as a display, processing unit, network interface, memory, operating system, etc.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more general purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware or a combination thereof.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer system comprising:
  memory; and
  a processor in communication with the memory and configured with processor-executable instructions to perform operations comprising:
    receiving first image data as input to an image classifier, wherein the image classifier is trained to identify each of a first plurality of target objects depicted in one or more images, wherein the image classifier comprises a multi-layered machine learning model;

determining, using the image classifier, that the first image data depicts a first target object of the first plurality of target objects;

providing a classification associated with the first target object as output of the image classifier for the first image data;

receiving second image data as input to the image classifier;

generating, by the image classifier when provided with the second image data as input, scores for each of the first plurality of target objects with respect to the second image data, wherein the scores are generated at an output layer of the image classifier based on feature information determined in a penultimate layer of the image classifier that is immediately prior to the output layer of the image classifier;

determining, based on the scores for each of the first plurality of target objects as generated at the output layer of the image classifier, that the image classifier is unable to identify any of the first plurality of target objects in the second image data with at least a threshold confidence level;

providing the feature information determined in the penultimate layer of the image classifier as input to a clustering model;

using the clustering model and the feature information determined in the penultimate layer of the image classifier, and without determining additional image features from the second image data, assigning the second image data to a first image cluster that includes a second plurality of images, wherein the second plurality of images comprises image data for which the image classifier was unable to identify any of the first plurality of target objects with at least the threshold confidence level, wherein the feature information associated with the second image data is similar to feature information associated with image data of at least one of the second plurality of images;

causing display of at least the second image data to an annotating user as a representative image from the first image cluster;

receiving input entered by the annotating user indicating a label representing a new target object depicted in at least the second image data, wherein the new target object is not one of the first plurality of target objects;

applying the label to each of the second plurality of images assigned to the first image cluster; and providing labeled image data from the first image cluster as training data to train the image classifier to identify the new target object.

2. The computer system of claim 1, wherein the label is applied to at least a subset of the second plurality of images without displaying any of the subset of the second plurality of images to any user.

3. The computer system of claim 1, wherein the first image data is a portion of an image, wherein the portion of the image is defined by a bounding region determined by a placement detector.

4. The computer system of claim 3, wherein the placement detector is configured to identify at least one area of interest in an image for further analysis by the image classifier.

5. The computer system of claim 3, wherein the placement detector is configured to identify a real world object depicted in image data, and wherein the first plurality of target objects that the image classifier is trained to identify comprise logos appearing on the real world object.

6. The computer system of claim 3, wherein the second image data is a second portion of the image.

7. The computer system of claim 1, wherein the first image data comprises at least a portion of a frame of a video.

8. The computer system of claim 7, wherein the operations further comprise determining an amount of time that the first target object appears in the video based on output of the image classifier for each of a plurality of frames of the video.

9. A computer-implemented method comprising:

receiving first image data as input to an image classifier, wherein the image classifier is trained to identify each of a first plurality of target objects depicted in one or more images, wherein the image classifier comprises a multi-layered machine learning model;

generating, by the image classifier when provided with the first image data as input, scores for each of the first plurality of target objects with respect to the first image data, wherein the scores are generated at an output layer of the image classifier based on feature information determined in a feature extraction layer of the image classifier that precedes the output layer;

determining, based on the scores for each of the first plurality of target objects as generated at the output layer of the image classifier, that the image classifier is unable to identify any of the first plurality of target objects in the first image data with at least a threshold confidence level;

providing the feature information determined in the feature extraction layer of the image classifier as input to a clustering model;

using the clustering model and the feature information determined in the feature extraction layer of the image classifier, assigning the first image data to a first image cluster that includes a second plurality of images, wherein the feature information associated with the first image data is similar to feature information associated with image data of at least one of the second plurality of images;

receiving indication of a label for the first image cluster, wherein the label represents a new target object depicted in at least the first image data, wherein the new target object is not one of the first plurality of target objects;

applying the label to each of the second plurality of images assigned to the first image cluster; and providing labeled image data from the first image cluster as training data to train the image classifier to identify the new target object.

10. The computer-implemented method of claim 9, wherein the indication of the label for the first image cluster is received via a user interface that presents one or more images from the first image cluster to a user.

11. The computer-implemented method of claim 9, wherein the label for the first image cluster is determined from a directory name given to a file directory that stores at least the second plurality of images.

12. The computer-implemented method of claim 9, wherein the image classifier is a deep neural network.

13. The computer-implemented method of claim 9, wherein the clustering model applies k-means clustering based on the feature information associated with the first image data and feature information for a plurality of other images that the image classifier was unable to classify.

14. The computer-implemented method of claim 9, wherein the first image data is a portion of an image, wherein the portion of the image is defined by a bounding region determined by a placement detector.

15. The computer-implemented method of claim 14, wherein the placement detector is configured to identify at least one area of interest in an image for further analysis by the image classifier.

16. The computer-implemented method of claim 14, wherein the placement detector is configured to identify a real world object depicted in image data, and wherein the first plurality of target objects that the image classifier is trained to identify comprise logos appearing on the real world object.

17. A computer-readable, non-transitory storage medium storing computer executable instructions that, when executed by one or more computer systems, configure the one or more computer systems to perform operations comprising:
- receiving first image data as input to an image classifier, wherein the image classifier is trained to identify each of a first plurality of target objects depicted in one or more images, wherein the image classifier comprises a multi-layered machine learning model;
- determining that the image classifier is unable to identify any of the first plurality of target objects in the first image data with at least a threshold confidence level;
- providing feature information determined at a feature extraction layer of the image classifier as input to a clustering model;
- using the clustering model and the feature information associated with the first image data, assigning the first image data to a first image cluster that includes a second plurality of images, wherein the feature information associated with the first image data as determined at the feature extraction layer of the image classifier is determined by the clustering model to be similar to feature information associated with image data of at least one of the second plurality of images;
- receiving indication of a label for the first image cluster, wherein the label represents a new target object depicted in at least the first image data, wherein the new target object is not one of the first plurality of target objects;
- applying the label to each of the second plurality of images assigned to the first image cluster; and
- providing labeled image data from the first image cluster as training data to train the image classifier to identify the new target object.

18. The computer-readable, non-transitory storage medium of claim 17, wherein the second plurality of images comprises thousands of images, wherein the label is automatically applied to the thousands of images based on the label being applied to one of: (a) a single image in the first image cluster or (b) a file directory that stores the second plurality of images.

19. The computer-implemented method of claim 9, wherein the feature extraction layer of the image classifier is immediately prior to the output layer of the image classifier and is a penultimate layer of the image classifier.

* * * * *